United States Patent [19]

Trapp

[11] Patent Number: 5,269,343

[45] Date of Patent: Dec. 14, 1993

[54] VALVE ACTUATOR

[75] Inventor: James M. Trapp, Galien, Mich.

[73] Assignee: Elkhart Brass Mfg. Co., Inc., Elkhart, Ind.

[21] Appl. No.: 866,731

[22] Filed: Apr. 10, 1992

[51] Int. Cl.$^5$ .............. F16K 37/00; F16K 31/50
[52] U.S. Cl. .............. 137/554; 251/229; 251/270; 251/266; 251/274; 251/279; 74/424.8 VA
[58] Field of Search ............. 137/554; 251/86, 229, 251/264, 266, 279, 270, 274; 74/424.8 VA

[56] References Cited

U.S. PATENT DOCUMENTS

| | | | |
|---|---|---|---|
| 831,468 | 9/1906 | Powell | 251/266 |
| 2,704,947 | 3/1955 | Hopkins | 251/266 X |
| 2,930,252 | 3/1960 | Sears et al. | 251/266 X |
| 3,380,471 | 4/1968 | Mueller et al. | 251/270 X |
| 3,522,596 | 8/1970 | Fowler et al. | 137/554 |
| 3,575,378 | 4/1971 | Fawkes | 251/229 |
| 3,606,242 | 9/1971 | Lathrop, II | 137/554 X |
| 3,679,172 | 7/1972 | Kerkau | 251/229 |
| 3,789,875 | 2/1974 | McGee | 137/554 X |
| 3,877,677 | 4/1975 | Daghe et al. | 251/229 X |
| 4,058,288 | 11/1975 | Carlson, Jr. | 251/229 |
| 4,149,561 | 4/1979 | Dalton | 251/229 X |
| 4,575,718 | 3/1986 | Ludowyk | 137/554 X |
| 4,625,758 | 12/1986 | Murray | 251/229 X |
| 4,721,131 | 1/1988 | Ciordinik et al. | 251/266 X |

*Primary Examiner*—John Rivell
*Attorney, Agent, or Firm*—James D. Hall; Thomas J. Dodd

[57] ABSTRACT

A valve actuator for opening and closing the shut-off valves on fire trucks. The actuator includes a push rod in communication with an actuator nut and a screw rod. A turn handle fastened to the screw rod allows for delayed opening and closing of the shut-off valves to prevent water shock. The valve actuator also includes magnetic sensors to provide a visual indication of the position of the valve to the operator.

23 Claims, 4 Drawing Sheets

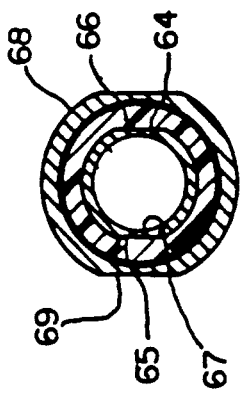
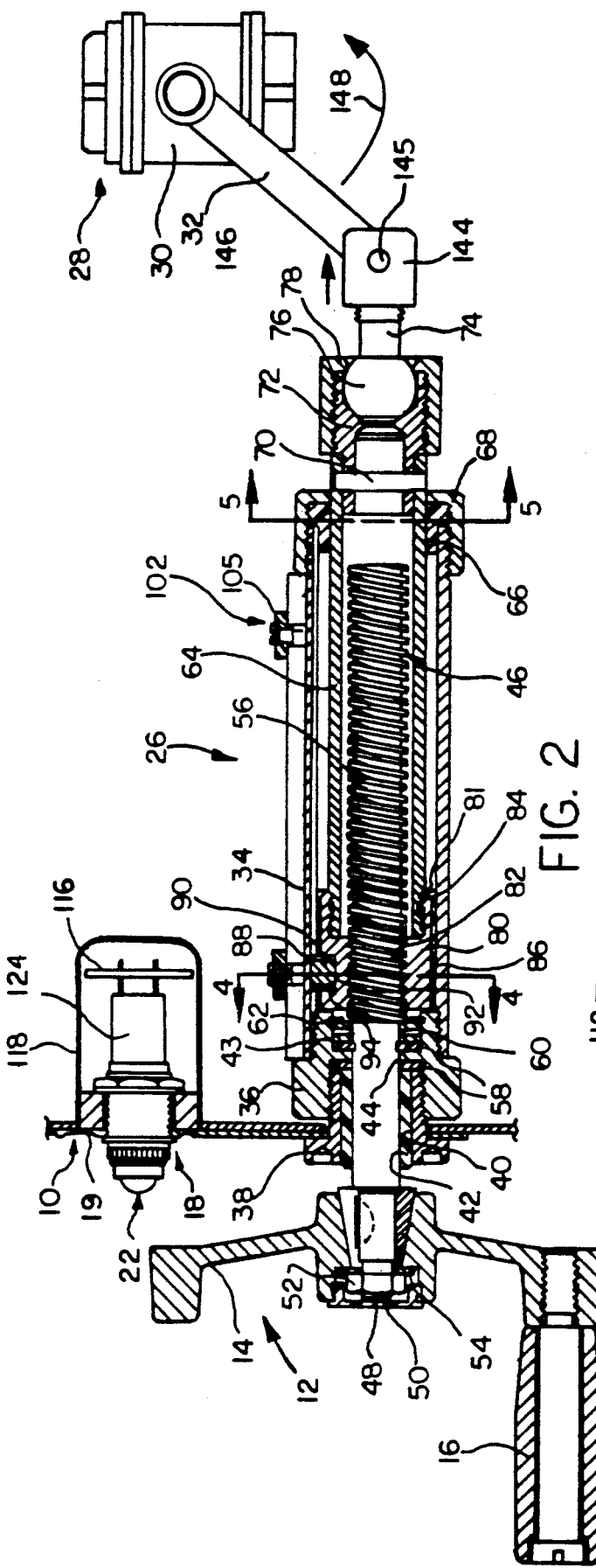
FIG. 2
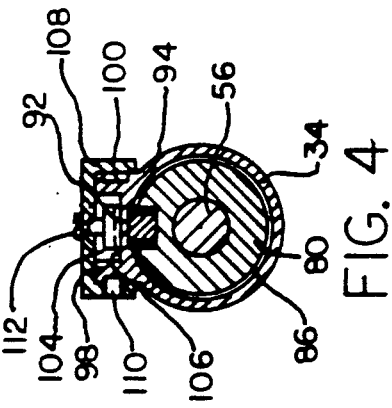
FIG. 5
FIG. 4

VALVE ACTUATOR

SUMMARY OF THE INVENTION

This invention relates to valve actuators and will have application to the valves commonly found on fire trucks.

Commonly, the main valve on a fire truck consists of a simple ball valve which has an outer turn handle to open a quarter turn to open and close the valve to control the flow of pressurized water out of the truck and to the fire hose.

The sudden opening of this valve releases water into the fire hose under very high pressure, necessary since the water must travel some distance when fighting a fire. The sudden pressure change in the hose often causes water shock and can be very dangerous to the firemen responsible for directing the nozzle. NFPA regulations have recently been enacted which require that certain trucks contain valve which can be gradually opened over a period of three or more seconds in order to reduce the risk of water shock.

The valve actuator of this invention includes a turnable handle mounted outside the fire truck and a valve actuator push rod in communication between the handle and the valve stop. A threaded rod is connected between the handle and an actuator nut to gradually slide the push rod between its extended position closing the valve, and its retracted position which opens the valve.

The valve actuator of this invention also utilizes magnetic sensors to detect the position of the push rod and the status of the valve at all times during use. A visual display is mounted on the truck and communicates with the sensors to provide a constant report on the operating status of the valve.

Accordingly, it is an object of this invention to provide for a novel and improved valve actuator.

Another object is to provide for a valve actuator which gradually opens and closes a main valve.

Another object is to provide for a fire truck valve controller which is adaptable to current valve designs.

Another object is to provide for a fire truck valve controller which conforms to fire code specifications and minimizes the effects of water shock.

Another object is to provide for a fire truck valve controller which provides for a constant visual display of the status of the valve.

Other objects will become apparent upon a reading of the following description.

BRIEF DESCRIPTION OF THE DRAWINGS

A preferred embodiment of the invention has been depicted for illustrative purposes only wherein:

FIG. 2 is a sectional view taken along line 2—2 of FIG. 1 with the valve shown in a closed position.

FIG. 4 is a sectional view taken along line 4—4 of FIG. 2.

FIG. 5 is a sectional view taken along line 5—5 of FIG. 2.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to follow its teachings.

Figure 1:
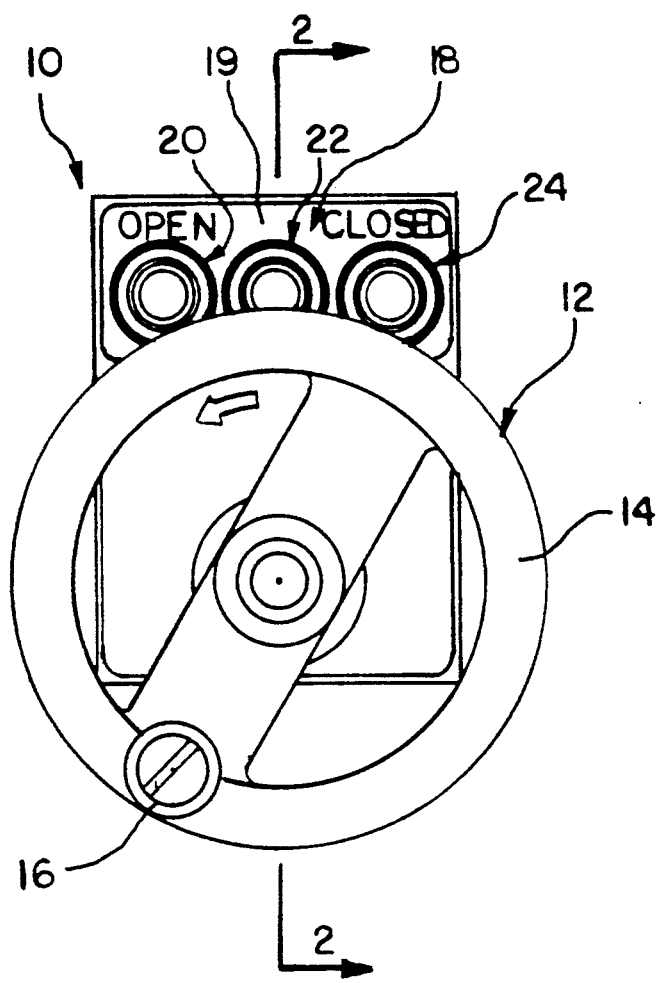
FIG. 1 is a plan view of the turn wheel and display system of the valve actuator of this invention.

FIG. 1 illustrates in plan view a portion of side panel 10 of a common fire truck pumping vehicle (not shown). Reference numeral 12 refers generally to the rotatable crank which includes a wheel 14 and turn knob 16. Reference numeral 18 refers generally to the visual display indicator which includes green light 20, amber light 22 and red light 24.

Figure 3:
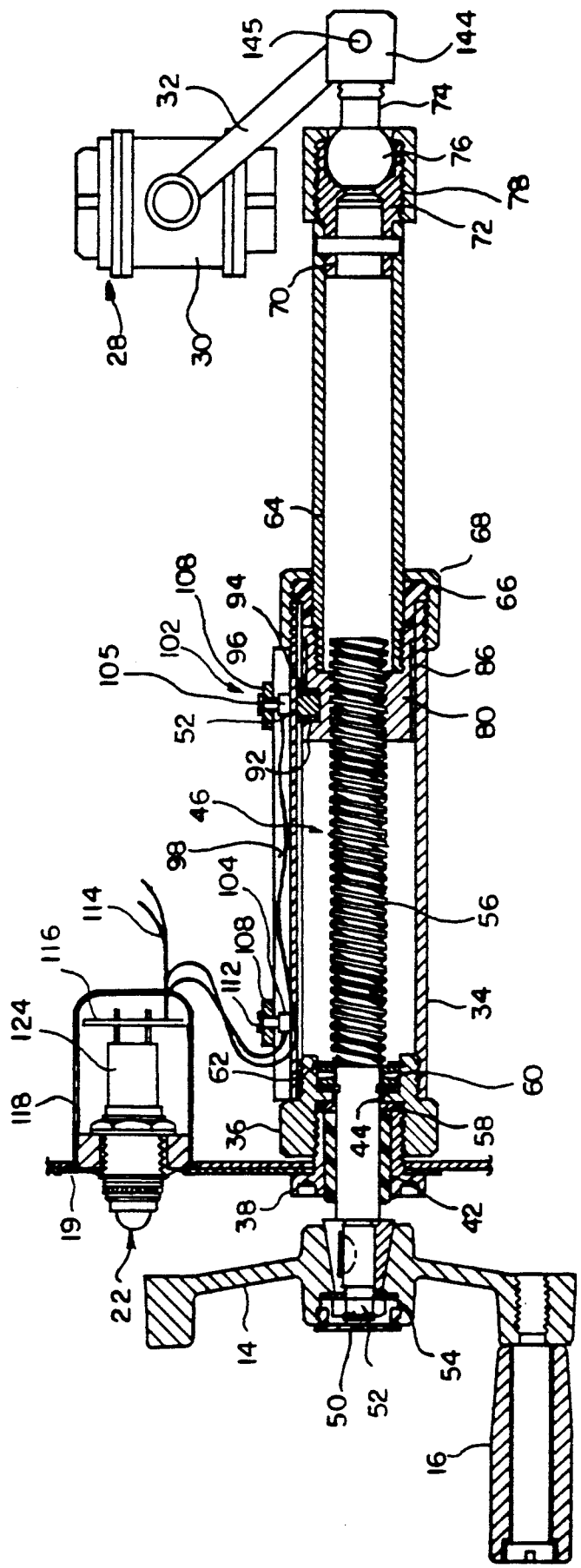
FIG. 3 is a sectional view similar to FIG. 2, but showing the valve in a full open position.

FIGS. 2 and 3 illustrate the valve actuator 26 in combination with valve 28. Valve 28, as shown, is a common ball-type valve, and includes valve housing 30 and manually rotatable turn handle 32. As is common, valve housing 30 houses a stop or ball (not shown) which is rotatable within the housing between open and closed positions in response to turning of handle 32. The operation and construction of valve 28 are well-known to those skilled in the art.

Actuator 26 includes an outer tubular housing 34 which is threadably connected to adapter nut 36. Nut 36 is threadably connected to guide adapter 38 which is secured to side panel 10 in an appropriate manner. Adapter 38 has a throughbore 40 which houses guide bushing 42 as shown. Nut 36 has an annular throughbore 43 partially interrupted by step annulus 44 as shown.

A translation screw 46 has a first terminal end 48 which houses a threaded screw 50. Screw 48 extends through wheel 14 as shown and is secured thereto at its terminal end 48 by nut 52 ans washer 54. Screw 46 includes a threaded shank 56 which extends through bores 40, 42 into tubular housing 34 as shown. Washers 58 and thrust bearing 60 are housed in nut 36 and circumscribe screw 46. Washers 58 and bearing 60 bear against step annulus 44 under the influence of snap ring 62.

Actuator 26 also includes tubular push rod 64 which is shiftably located in housing 34 as shown. Bushing 66 and end cap 68, which is threadably connected to housing 34, assure substantially straight line shifting movement of push rod 64. Push rod 64 is connected as by pin 70 to ball joint fitting 72 which houses control rod 74. Control rod 74 includes integral ball 76. End cap 78 is threadably secured to fitting 72 to secure control rod 76 to the fitting as shown.

Actuator nut 80 is slidably fitted in tubular housing 34. Nut 80 defines threaded throughbore 82 which is connected to threaded shank 56 of translation screw 46. Nut 80 also includes threads 84 which mate with threads 65 of push rod 64 to ensure correlative sliding movement of the actuator nut and the push rod.

Annular bushing 86 circumscribes actuator nut 80 as shown. Bushing 86 and nut 80 have aligned openings 90, 88 respectively, with bore 90 extending through bushing 86. A magnet 92 which is surrounded by bushing 94 is fitted in bores 88, 90 and includes outer edge 96 which rides against the inner edge of tubular housing 34.

Tubular housing 34 is preferably of the general cross-sectional configuration shown in FIG. 4. As shown, housing 34 includes integral upper rails 98 which run substantially the length of the housing on each side. One or both rails 98 define a detent 100 as shown.

Two or more position sensors 102 are connected to tubular housing 34. Sensors 102 are electrically coupled to visual display indicator 18 as described below. Each sensor 102 (two shown) includes a digital position sensor 104 or 105 which rests on the flat upper edge 106 of tubular housing 34 between rails 98. Bracket 108 is generally U-shaped and fits over rails 98 as shown. Bracket 108 is secured to tubular housing 34 as by set screw 110 which is secured in detent 100 as shown. Digital position sensors 104 are secured as by screws 112 to tubular housing 34.

Each sensor 102 is connected as by common wire leads 114 (FIG. 3) to a printed circuit (PC) board 116 located in lamp housing 118. The connection between sensors 102 and PC board 116 may pass through conventional wiring harnesses (not shown). The electrical elements of PC board 116 are shown in FIG. 6 and described below.

Lamp housing 118 as shown in FIGS. 1-3 carries three incandescent indicator lamps 120, 121, and 122. Preferably, the lamps 120-122 are color coordinated with each lamp's individual function, green indicating an open valve, red for a closed valve, and yellow (amber) for a partially open valve. Each lamp 120-122 includes a housing 124 (only one shown) which connects to PC board 116.

Figure 6:
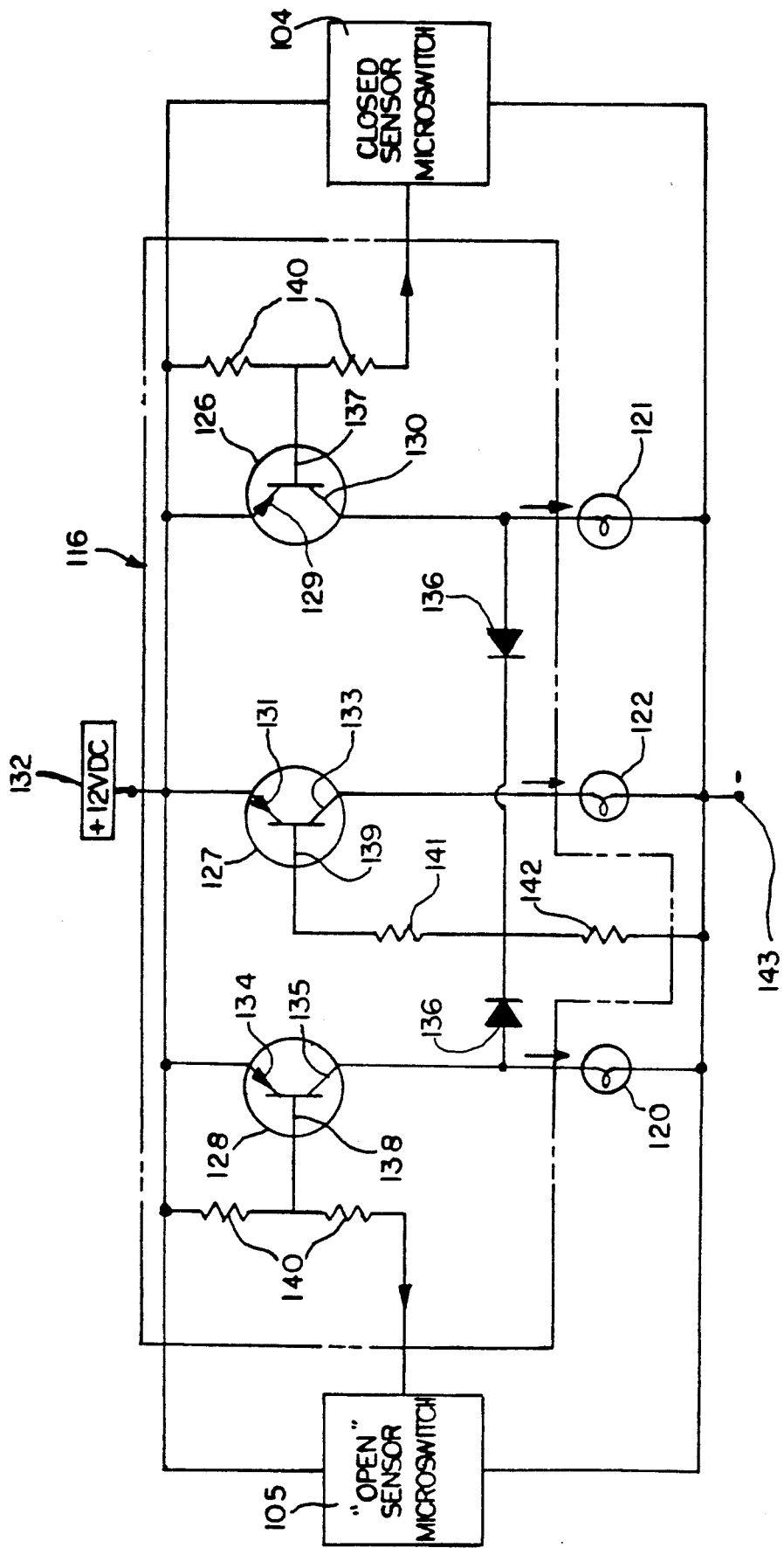
FIG. 6 is a schematic view of the display system.

FIG. 6 illustrates the electrical components of PC board 116. Board 116 includes three PNP transistors 126, 127, and 128 connected in parallel between sensors 104, 105. Transistor 126 has its emitter 129 connected to sensor 104 and its collector 130 connected to lamp 121. Transistor 127 has its emitter 131 connected to the vehicle battery 132 and its collector 133 connected to lamp 122. Transistor 128 has its emitter 134 connected to sensor 105 and its collector 135 connected to lamp 120. Diodes 136 ensure that only one of lamps 120-122 is lit at any one time. The bases 137, 138 of transistors 126, 128 respectively are connected to each sensor 104, 105 through a pair of resistors 140. The base 139 of transistor 127 is connected to ground 143 through resistors 141, 142.

Actuator 26 operates to open and close valve 28 as follows. With the valve handle 32 in the closed position of FIG. 2, an operator turns wheel 14 in a counterclockwise direction to rotate its connected translation screw 46. As the screw 46 rotates, actuator nut 80 rides along threaded shank 56 towards tubular housing end cap 68. The fixed thread connection between push rod 64 and actuator nut 80 ensures the correlative movement of the push rod and its connected fitting 72 and control rod 76 in the direction of arrow 146.

Control rod 76 is mechanically connected to valve handle 32 as by a clevis 144 and pin 145. As control rod 76 extends, handle 32 is gradually rotated (see arrow 148) towards its full open position of FIG. 3. Extension of rod 64 is halted when foot 81 of adapter nut 80 contact bushing 66.

When it is desired to close valve 28, the operator turns wheel 14 in a clockwise direction to effect travel of actuator nut 80 and push rod 64 back towards the closed position of FIG. 2. The mechanical connection between control rod 76 and valve handle 32 rotates the valve handle gradually back to its closed orientation to cut off water flow through valve 28. Movement stops when actuator nut 80 contacts adapter nut 36.

The speed at which actuator nut 80 travels along translation screw 46 is dependent upon the speed at which the operator turns wheel 14 and the spacing of threads on shank 56. Due to the regulations enacted by NFPA, it is desirable that even at maximum turning speed of the wheel 14, actuator nut 80 takes at least three seconds to traverse the distance between the positions shown in FIGS. 2 and 3.

It should be noted that the outer surface 65 of push rod 64 and the throughbore 67 of bushing 66 are of a mating oblate configuration as shown in FIG. 5. This configuration prevents rotation of the push rod 64 during shifting movement described above. The outer surface 69 of end cap 68 may also be of oblate configuration.

It should further be noted that the mechanical connections 144, 145 between control rod 76 and valve handle 32 are for purposes of illustration only and not limitative of the invention. Individual configurations for the large numbers of valves 28 currently in use will dictate the components and their connection sites and orientations.

Visual display indicator 18 functions to inform the operator of the status of valve 28 as follows. When the actuator 26 is in the closed position of FIG. 2, the magnet 92 is preferably aligned with sensor 104. Sensor 104 detects the magnetic field generated by magnet 92 and closes its microswitch to send current through transistor 126 to lamp 121. This lights red light 24 on display panel 19.

As actuator nut 80 travels away from sensor 104 in response to rotation of translation screw 46, the microswitch of sensor 104 opens and current from battery 132 travels through transistor 127 to lamp 122. This lights yellow or amber light 22 on display panel 19.

When the actuator nut 80 and magnet 92 reach the full open position of FIG. 3, sensor 105 detects the magnetic field and closes to send current through transistor 128 to lamp 120. This lights the green light 20 on panel 19 to inform the operator that the valve 28 is fully open.

In the interests of clarity, the harness-wire connections between sensors 104, 105 and PC board 116 have been omitted. Any desirable connections, which are within the skill in the art, may be used to electrically couple the sensors (commonly known in the trade as Hall Effect Sensors) and the display lights to produce the results described.

The foregoing description is not to be considered as limiting the invention to those details above-given, which may be modified within the scope of the following claims.

We claim:

1. In combination, a valve, and actuator means for opening and closing said valve, said valve including a valve housing having a passageway for allowing fluid to flow through the valve housing, shiftable stop means carried by said valve housing for selectively allowing or preventing fluid flow through said passageway, said actuator means comprising a tubular housing, a push rod shiftably positioned in said tubular housing, means for shifting said push rod between a retracted position and an extended position, said push rod having a proximal end adjacent said means for shifting and a distal end adjacent said stop means, said means for shifting including a threaded rod rotatably positioned in said tubular housing, a follower nut connected to said threaded rod and said push rod, means for rotating said threaded rod wherein said follower nut reciprocates within said tubular housing in response to rotation of said threaded rod to shift the push rod between said extended and retracted positions, and a control rod pivotally connected to said push rod distal end, said control rod operatively coupled to said stop means wherein said stop means is shifted between open and closed positions in response to shifting of the push rod.

2. The combination of claim 1 wherein said means for rotating said threaded rod includes a manually rotatable turn wheel, means for connecting said turn wheel and threaded rod.

3. The combination of claim 1 wherein said follower nut is fixedly connected to said push rod by mating threads.

4. The combination of claim 3 and further including a bushing fitted in said tubular housing, said bushing having an oblate throughbore, said push rod having an outer surface complemental with said throughbore and extending therethrough.

5. The combination of claim 4 and further including an end cap connected to a terminal end of said tubular housing, said end cap constituting means for securing said bushing within said housing.

6. The combination of claim 1 wherein said stop means includes a turn handle rotatably fastened to said valve housing between said open and closed positions.

7. The combination of claim 6 and a link member connected between said control rod and said turn handle.

8. The combination of claim 1 and display means for visually indicating a status condition of said valve stop means.

9. The combination of claim 8 wherein said display means includes first and second display lights, means for sensing the position of said push rod and its connected follower nut, and circuit means for electrically connecting said means for sensing to the display lights to selectively illuminate one of said lights.

10. The combination of claim 9 wherein said means for sensing includes a magnet and first and second magnetic operated spaced switches connected to said housing.

11. The combination of claim 10 wherein said display means includes a third display light, said circuit means including a power source, first transistor means for coupling said power source to said third display light, second and third transistor means connected in parallel with said first transistor means for coupling said first and second switches to said first and second display lights whereby only one of said display lights is illuminated at a given time.

12. The combination of claim 11 wherein each display light is of a different color.

13. A valve actuator comprising:
a) a tubular housing;
b) means for securing said tubular housing to a wall;
c) a push rod located in said tubular housing;
d) a screw rod located in said push rod and having a terminal end extending through said wall;
e) an actuator nut movably connected to said screw rod and fixedly connected to said push rod;
f) handle means for effecting rotation of said screw rod and corresponding lineal motion of said actuator nut and push rod;
g) means for sensing the position of said actuator nut relative to said screw rod; and
h) display means coupled to means for sensing for visually displaying said position;
said push rod having a terminal end located adjacent to a valve handle and including for means connecting the push rod to the valve handle, wherein lineal movement of said push rod opens and closes a valve.

14. The valve actuator of claim 13 and further including a bushing fitted in said housing, said bushing having an oblate throughbore, said push rod having an outer surface complemental with said throughbore and extending therethrough.

15. The valve actuator of claim 13 wherein said push rod terminal end includes a control rod pivotally housed in a fitting, said fitting connected to said push rod at said terminal end.

16. The valve actuator of claim 14 and further including an end cap connected to a terminal end of said housing, said end cap constituting means for securing said bushing within said housing.

17. The valve actuator of claim 13 wherein said means for connecting includes a link member connected between said push rod terminal end and said valve handle.

18. The valve actuator of claim 13 wherein said display means includes first and second display lights, and circuit means for electrically connecting said means for sensing to the display lights to selectively illuminate one of the display lights.

19. The valve actuator of claim 18 wherein said means for sensing includes a magnet and first and second magnetic operated spaced switches connected to said housing.

20. The valve actuator of claim 19 wherein said display means includes a third display light, said circuit means including a power source, first transistor means for coupling said power source to said third display light, second and third transistor means connected in parallel with said first transistor means for coupling said first and second switches to said first and second display lights whereby only one of said display lights is illuminated at a given time.

21. In combination, a valve, and actuator means for opening and closing said valve, said valve including a valve housing having a passageway for allowing fluid to flow through the valve housing, shiftable stop means carried by said valve housing for selectively allowing or preventing fluid flow through said passageway, said actuator means comprising a tubular housing, a push rod shiftably positioned in said tubular housing and having a terminal end positioned adjacent to said stop means, means for shifting said push rod between a retracted position and an extended position, said means for shifting including a threaded rod rotatably positioned in said tubular housing, a follower nut connected to said threaded rod and said push rod, means for rotating said threaded rod wherein said follower nut reciprocates within said tubular housing in response to rotation of said threaded rod to shift the push rod between said extended and retracted positions, means for preventing rotation of said push rod relative to said tubular housing positioned adjacent a terminal end of said tubular housing, cap means for securing said means for preventing within said housing, and means for connecting said push rod to said stop means wherein said stop means is shifted between open and closed positions in response to shifting of the push rod.

22. The combination of claim 21 wherein said means for preventing includes a bushing having an oblate throughbore, said push rod having an outer surface configuration complemental with said throughbore and extending therethrough.

23. The combination of claim 21 wherein said means for preventing includes a bushing having a throughbore defining at least one flat surface, said push rod having an outer surface configuration complemental with said throughbore and extending therethrough.

* * * * *